United States Patent
Reed et al.

(10) Patent No.: US 11,461,718 B2
(45) Date of Patent: Oct. 4, 2022

(54) DIRECT TO STORE SUPPLY CHAIN SYSTEM AND METHOD

(71) Applicant: Niagara Bottling, LLC, Ontario, CA (US)

(72) Inventors: Brian Dwain Reed, Ontario, CA (US); Canaan Orion Reich, Ontario, CA (US); Alyssa Anne Correale, Ontario, CA (US)

(73) Assignee: Niagara Bottling, LLC, Diamond Bar, CA (US)

( * ) Notice: Subject to any disclaimer, the term of this patent is extended or adjusted under 35 U.S.C. 154(b) by 559 days.

(21) Appl. No.: 14/850,712

(22) Filed: Sep. 10, 2015

(65) Prior Publication Data

US 2016/0086118 A1 Mar. 24, 2016

Related U.S. Application Data

(60) Provisional application No. 62/052,728, filed on Sep. 19, 2014.

(51) Int. Cl.
*G06Q 10/06* (2012.01)
*G06Q 10/08* (2012.01)

(52) U.S. Cl.
CPC ..... *G06Q 10/06315* (2013.01); *G06Q 10/087* (2013.01)

(58) Field of Classification Search
CPC ...... G06Q 10/087; G06Q 10/08; G06Q 30/04; G06Q 10/06316; G06Q 10/06375; G06Q 30/06; G06Q 30/0605
USPC ......... 705/7.11, 7.25, 28, 26.1, 26.8; 186/53
See application file for complete search history.

(56) References Cited

U.S. PATENT DOCUMENTS

| 4,621,325 | A | 11/1986 | Naftzger et al. |
| 6,937,992 | B1 * | 8/2005 | Benda ................ G06Q 10/04 705/7.26 |
| 7,574,365 | B2 | 8/2009 | Miller et al. |
| 8,001,017 | B1 | 8/2011 | Franco |
| 8,006,903 | B2 | 8/2011 | Braun et al. |

(Continued)

OTHER PUBLICATIONS

S. Chartniyom, M. K. Lee, L. Luong and R. Marian, "Multi-Location Inventory System with Lateral Transshipments and Emergency Orders," 2007 IEEE International Conference on Industrial Engineering and Engineering Management, 2007, pp. 1594-1598, doi: 10.1109/IEEM.2007.4419461. (Year: 2007).*

(Continued)

*Primary Examiner* — Cory W Eskridge
(74) *Attorney, Agent, or Firm* — Michael Best & Friedrich LLP

(57) ABSTRACT

A system and a method are provided for a direct to store supply chain to bring high volume, bulk space products directly from suppliers, manufacturers, and vendors to retail locations, thereby bypassing retailer distribution centers. The system comprises an order management and invoicing system configured to facilitate demand signals from retail locations to manufacturers and vendors of desired products. A routing optimization system is configured to continually optimize an aggregate of orders so as to produce lowest-cost shipping solutions. A tracking and notification system is configured to provide manufacturers with clear tracking visibility of en-route deliveries once they leave manufacturing facilities.

18 Claims, 2 Drawing Sheets

(56) References Cited

U.S. PATENT DOCUMENTS

| | | | |
|---|---|---|---|
| 8,369,587 B2 | 2/2013 | Hsieh et al. | |
| 8,494,916 B2 | 7/2013 | Connors et al. | |
| 8,521,621 B1 | 8/2013 | Hetzer et al. | |
| 8,762,212 B2 | 6/2014 | Falls et al. | |
| 2001/0037255 A1* | 11/2001 | Tambay | G06Q 30/02 705/26.1 |
| 2002/0007302 A1 | 1/2002 | Work et al. | |
| 2002/0019759 A1* | 2/2002 | Arunapuram | G06Q 30/04 705/7.26 |
| 2002/0156707 A1* | 10/2002 | Reid | G06Q 10/06 705/28 |
| 2003/0023501 A1* | 1/2003 | Alling | G06Q 10/087 705/26.8 |
| 2003/0110104 A1* | 6/2003 | King | G06Q 10/087 705/28 |
| 2003/0172007 A1* | 9/2003 | Helmolt | G06Q 10/06316 705/28 |
| 2005/0256787 A1* | 11/2005 | Wadawadigi | G06Q 10/087 705/28 |
| 2005/0288989 A1 | 12/2005 | Kim et al. | |
| 2006/0085299 A1 | 4/2006 | Goll et al. | |
| 2007/0038673 A1 | 2/2007 | Broussard et al. | |
| 2007/0187183 A1* | 8/2007 | Saigh | E04H 14/00 186/53 |
| 2009/0099971 A1 | 4/2009 | Salemme et al. | |
| 2010/0138281 A1* | 6/2010 | Zhang | G06Q 20/203 705/28 |
| 2010/0166533 A1 | 7/2010 | Hering | |
| 2010/0235210 A1 | 9/2010 | Nadrotowicz | |
| 2011/0050423 A1* | 3/2011 | Cova | G06Q 10/0833 340/572.1 |
| 2011/0173034 A1* | 7/2011 | Riepshoff | G06Q 10/00 705/7.11 |
| 2012/0316931 A1 | 12/2012 | Conlan et al. | |
| 2013/0117055 A1 | 5/2013 | Abdic et al. | |
| 2014/0207619 A1 | 7/2014 | Ishebabi | |
| 2016/0086118 A1* | 3/2016 | Reed | G06Q 10/06315 705/7.25 |

OTHER PUBLICATIONS

International Search Report for PCT/US15/49477 dated Sep. 10, 2015.

* cited by examiner

DIRECT TO STORE SUPPLY CHAIN SYSTEM AND METHOD

PRIORITY

This application claims the benefit of and priority to U.S. Provisional Application No. 62/052,728 filed on Sep. 19, 2014, entitled "Direct to Store Supply Chain System and Method." The entirety of said application is incorporated herein by reference.

FIELD

The field of the present disclosure generally relates to supply chain systems. More particularly, the field of the present disclosure relates to a system and a method for a direct to store supply chain configured to bring high volume, bulk space product directly from suppliers to retail locations, thereby bypassing retailer distribution centers.

BACKGROUND

A retail distribution network typically comprises centers set up throughout a commercial market, each of which centers serving a certain number of stores. Large distribution centers typically serve 50-125 stores. Generally, suppliers ship truckloads of products to the distribution center, which then houses the products until they are needed by a retail location. Once a retailer places an order for products, the supplier ships the proper quantity of products from the distribution center to the retail location. Many retailers own and run their own distribution networks, whereas smaller retailers may outsource this function to dedicated logistics firms that coordinate the distribution of products for a number of companies.

A drawback to conventional retail distribution networks is that quantities of products which must be housed are often times much larger than are needed by the retail locations. Another drawback to conventional retail networks is that large dimensioned products which flow in large volumes through normal shipping carriers are difficult and expensive to handle, and occupy warehouse capacity that could be used for other products. What is needed, therefore, is a system and a method for shipping bulk space products directly from a multiplicity of suppliers to various retail locations, based on flexible order quantities and delivery route optimization.

SUMMARY

A system and a method are provided for a direct to store supply chain to bring high volume, bulk space product directly from suppliers to retail locations. The system comprises an order management and invoicing system configured to route demand signals from retail locations to suppliers of desired products. The demand signals are routed from the retail locations to the intended suppliers by way of a demand signal routing system. The order management and invoicing system preferably comprises a vendor-managed inventory (VMI) platform that enables the suppliers to create and adjust orders for the retail locations. In some embodiments, the order management and invoicing system comprises a customized web-based mobile device application, available to personnel working within the retail locations, whereby retail locations that are unable to operate under the VMI platform may send demand signals to the suppliers. A routing optimization system continually optimizes an aggregate of orders so as to produce lowest-cost shipping solutions. The routing optimization system is configured to use quantity tolerances for each retail location, as well as product weights and sizes for each product to determine an optimal order quantity for each retail location. In some embodiments, the routing optimization system assembles single or multi-stop truckloads of products and routes shipments so as to maximize the quantity of freight comprising each truckload. A tracking and notification system provides the suppliers and the retail locations with tracking information about en-route deliveries. In some embodiments, the tracking and notification system is configured to enable suppliers to take various actions necessary to ensure on-time deliveries.

In an exemplary embodiment, a system for a direct to store supply chain to bring high volume, bulk space product directly from suppliers to retail locations comprising: an order management and invoicing system configured to route demand signals from the retail locations to suppliers of desired products; a routing optimization system configured to continually optimize an aggregate of orders so as to produce lowest-cost shipping solutions; and a tracking and notification system configured to provide the suppliers with tracking information about en-route deliveries.

In another exemplary embodiment, the system further comprises a demand signal routing system configured to communicate demand signals from the retail locations to the intended suppliers. In another exemplary embodiment, the tracking and notification system is further configured to enable the suppliers to take necessary actions to ensure on-time deliveries to the retail locations. In another exemplary embodiment, the routing optimization system is configured to consider at least one of payload optimization, delivery routing, delivery dates, delivery times, and locations.

In another exemplary embodiment, the order management and invoicing system comprises a vendor-managed inventory (VMI) platform, whereby the suppliers may create and adjust orders for the retail locations desiring to buy various products. In another exemplary embodiment, the order management and invoicing system comprises a custom replenishment signal, whereby the retail locations that are unable to operate under the VMI platform may still send demand signals to the suppliers. In another exemplary embodiment, the custom replenishment signal comprises a customized web-based mobile device application available to personnel working within the retail locations.

In another exemplary embodiment, the routing optimization system is configured to use quantity tolerances for each retail location and product weights for each product so as to determine an optimal order quantity for each retail location. In another exemplary embodiment, the routing optimization system is configured to build truckloads of products and route shipments so as to maximize the quantity of freight comprising each truckload. In another exemplary embodiment, the routing optimization system is configured to consider delivery windows and then schedule shipping appointments for each retail location. In another exemplary embodiment, the delivery window associated with each retail location varies with each day of the week. In another exemplary embodiment, the routing optimization system is configured to utilize an optimization engine to automatically adjust initial customer orders by a set or flexible pallet, or a case count to maximize the quantity of freight comprising each single or multi-stop truckload.

In another exemplary embodiment, the tracking and notification system is configured to provide the suppliers with actionable alerts based upon updates received from carriers in connection with truckloads in transit. In another exemplary embodiment, the tracking and notification system is coupled with EDI 214 data communications to identify shipments that may miss scheduled delivery appointments. In another exemplary embodiment, the tracking and notification system is configured to alert the retail locations about the status of inbound deliveries.

In an exemplary embodiment, a method for a direct to store supply chain to direct products from suppliers to retail locations comprises: routing demand signals from one or more retail locations to intended suppliers of products; optimizing an aggregate of orders so as to produce lowest-cost shipping solutions; and providing the suppliers with tracking information about en-route deliveries.

In another exemplary embodiment, routing comprises providing a vendor-managed (VMI) platform to enable the suppliers to create and adjust orders for the retail locations. In another exemplary embodiment, routing comprises providing a customized web-based mobile device application, whereby personnel working within the retail locations may send custom replenishment signals to the suppliers. In another exemplary embodiment, optimizing comprises assembling truckloads of the products based on at least one of product shipping quantities, product physical properties, delivery routing, delivery dates, delivery times, and locations so as to maximize the quantity of the products comprising each of the truckloads. In another exemplary embodiment, providing comprises receiving updates from carriers in connection with truckloads in transit and then providing actionable alerts to the suppliers. In another exemplary embodiment, providing comprises conveying status information to the retail locations about inbound truckloads.

BRIEF DESCRIPTION OF THE DRAWINGS

The drawings refer to embodiments of the present disclosure in which.

Figure 1:
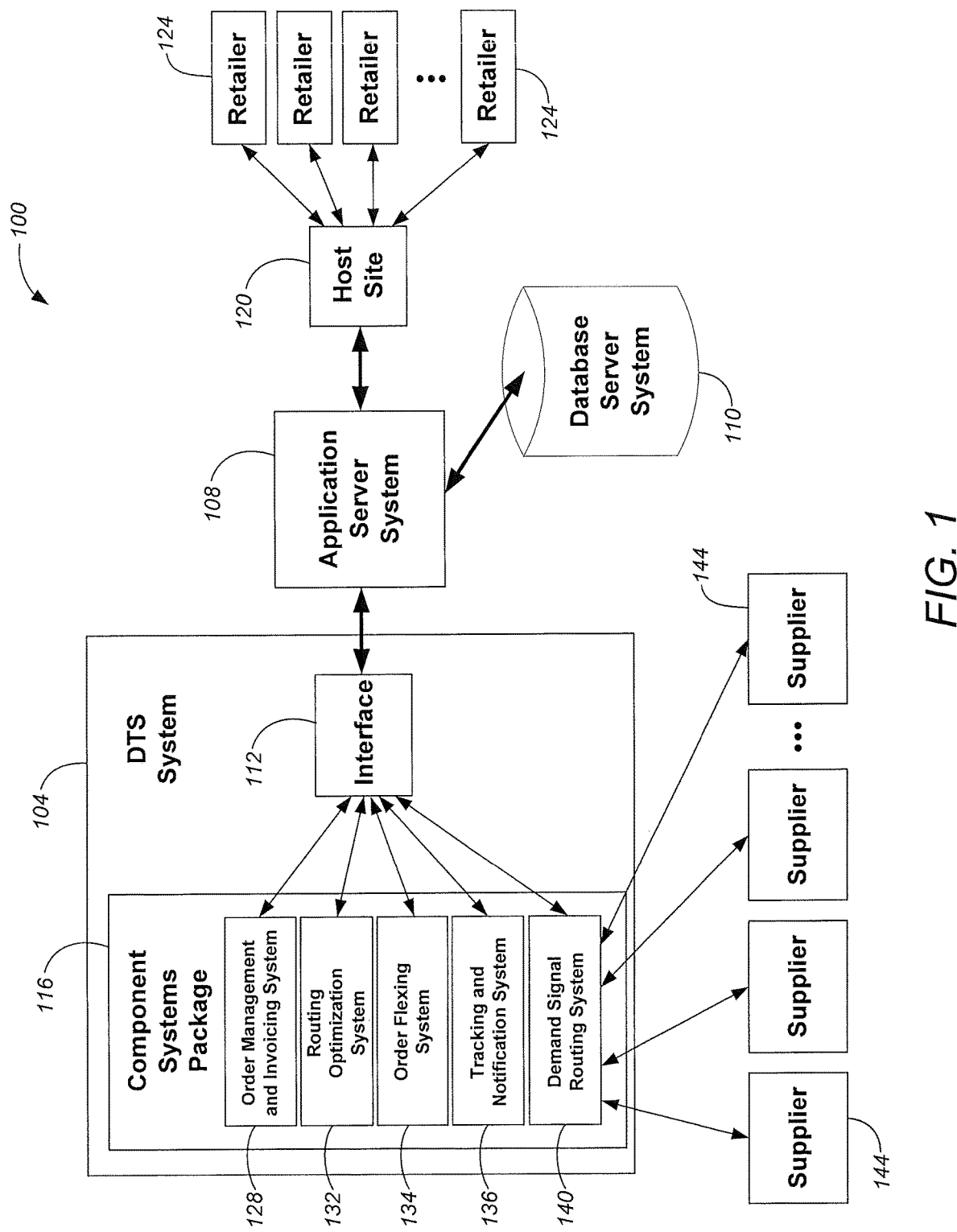
FIG. 1 is a schematic illustrating an exemplary embodiment of a supply chain communication system in accordance with the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first retailer," may be made. However, the specific numeric reference should not be interpreted as a literal sequential order but rather interpreted that the "first retailer" is different than a "second retailer." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

In general, the present invention describes a system and a method for a direct to store (DTS) system to bring high volume, bulk space product directly from manufacturers to business retail locations, thereby bypassing retailer distribution centers. The DTS system comprises an order management and invoicing system configured to facilitate demand signals from retail locations to manufacturers and vendors of desired products. In one embodiment, the order management and invoicing system comprises a customized web-based mobile device application available to personnel working within business retail locations. A routing consolidation and optimization system continually optimizes an aggregate of orders to develop lowest-cost shipping solutions. In one embodiment, the routing consolidation and optimization system is configured to build truckloads of products and route shipments so as to maximize the quantity of products on each truck. A tracking and notification system provides manufacturers with clear tracking visibility of en-route deliveries once they leave manufacturing facilities. In one embodiment, the tracking and notification system is configured to update retail stores about the status of inbound shipments. It will be recognized that the DTS system eliminates unnecessary handling, storage, and shipment costs typically arising between manufacturers and retailers, and thus drives efficiency and reduces overall supply chain costs.

FIG. 1 is a schematic illustrating an exemplary embodiment of a supply chain communication system 100 in accordance with the present disclosure. The supply chain communication system 100 comprises a DTS system 104 stored on a non-transient machine-readable medium (i.e., a memory) of an application server system 108 which comprises at least one processor and has connectivity to at least one database server system 110. Generally, the database server system 110 stores data specific to the operation of the DTS system 104, such as, by way of non-limiting example, lists of retail locations, suppliers, manufacturers, shipping carriers, product properties, quantities previously ordered by the retail locations, as well as any other information which may be required for operating the DTS system 104.

As shown in FIG. 1, the DTS system 104 comprises an interface 112 which provides access to a component systems package 116. A host site 120 provides a multiplicity of retailers 124 access to the application server system 108 by way of a communications network, such as the Internet. The retailers 124 comprise organizations, such as, by way of example, retail locations desiring to purchase products from various manufacturers, vendors, and the like. It will be appreciated that the data accessible to each organization preferably is segregated by type of organization and between organizations, such that different organizations cannot view data pertaining to other organizations. In some embodiments, the host site 120 comprises a web-based application by which the retailers 124 interact with the component systems package 116. In some embodiments, the host site 120 may comprise a customized web-based mobile device application which enables retailer personnel to directly interact with the component systems package 116. Further, in some embodiments, the DTS system 104 may comprise one or more servers dedicated to facilitating communication and connectivity to the Internet. In other embodiments, the DTS system 104 may comprise additional servers, such as, by way of non-limiting example, one or more servers dedicated to mobile communications and connectivity by way of a communications network other than the Internet.

Preferably, each of the retailers 124 utilizes applications stored on the memory of the application server system 108 to send demand signals to one or more of various suppliers 144 so as to receive desired products. Generally, the suppliers 144 comprise organizations, such as, by way of example, manufacturers, shippers, vendors, retail locations, and the like. In one embodiment, the component systems package 116 is stored on the memory of the application server system 108, and the interface 112 is a software application which comprises a portion of the DTS system 104, thereby providing access to the component systems package 116. In one embodiment, the component systems package 116 is stored on the memory of the database server system 110, and the interface 112 enables interaction between the application server system 108 and the component systems package 116 on the database server system 110. In some embodiments, the component systems package 116 may be services operated by one or more third-party service providers. In such embodiments, the interface 112 may comprise a connection over the communications network, such as an Internet connection, whereby the application server system 108 may send requests to, and receive services from the one or more third-party service providers.

As will be appreciated, the component systems package 116 generally comprises component systems whereby a manufacturer's technology footprint may be optimized, such as an order management and invoicing system 128, a routing optimization system 132, a tracking and notification system 136, and a demand signal routing system 140. In some embodiments, however, the component systems package 116 may comprise other systems in addition to the component systems illustrated in FIG. 1, without limitation and without deviating beyond the spirt and scope of the present disclosure. Each of the systems comprising the component systems package 116 is described below.

Order Management and Invoicing

Figure 2:
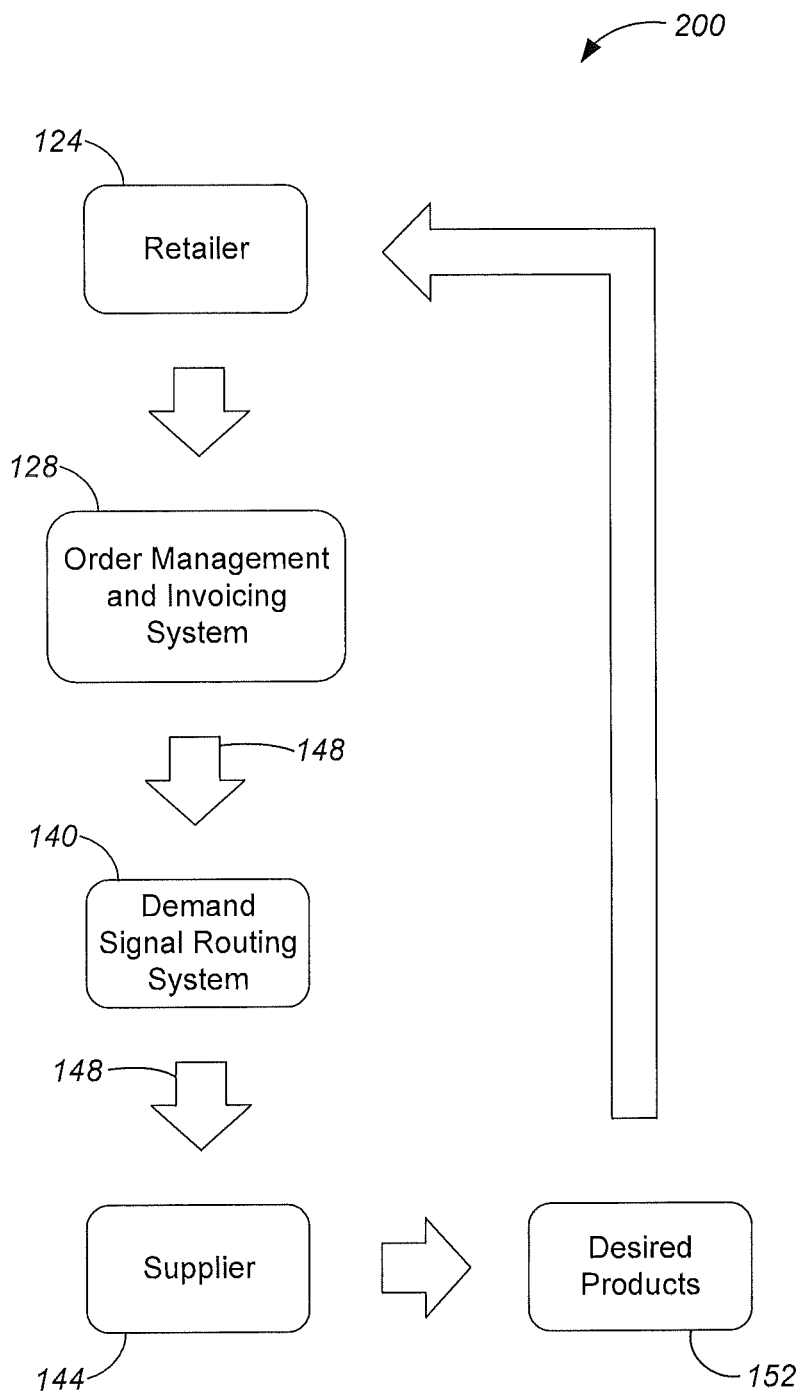
FIG. 2 is a schematic illustrating an exemplary embodiment of a demand signal communication between a retailer and a supplier, according to the present disclosure.

It will be appreciated that order management is a crucial component of any supply chain environment. The order management and invoicing system 128 facilitates communicating demand signals between business retail locations, manufacturers, shippers, vendors of desired products, and the like. FIG. 2 is a schematic illustrating an exemplary embodiment of demand signal communication 200, according to the present disclosure. In the illustrated embodiment, a demand signal 148 from a retailer 124, such as a specific retail location, is relayed directly to a supplier 144, such as a manufacturer or vendor of desired products 152. The demand signal 148 is directed to the order management and invoicing system 128 before being passed directly to the supplier 144 by way of the demand signal routing system 140. Upon receiving the demand signal 148, the supplier 144 ships the desired products 152 to the retailer 124. The demand signal enables the supplier 144 to ship less than full truckloads of the products within flexible delivery date windows, so as to prevent products from becoming out of stock (OOS). As described below in connection with the route optimization system 132, truck payloads comprising various quantities of different products may be optimized, such that shipping occurs in full truckloads.

In some embodiments, the order management and invoicing system 128 comprises a vendor-managed inventory (VMI) platform, whereby vendors, such as the suppliers 144, may create and adjust orders for the retail locations 124 desiring to buy various products. In some embodiments, the retail location 124 provides a demand signal 148, as well as certain other pertinent information, to the supplier 144 of the product and the supplier 144 takes responsibility for maintaining an agreed inventory of the product, usually at the business retail location (i.e., a store). It is further envisioned that the DTS system 104 operating on the VMI platform facilitates adjusting orders after the initial demand signal has been sent to the supplier 144.

In some embodiments, the order management and invoicing system 128 comprises a custom replenishment signal, whereby retail locations 124 that are unable to operate under the VMI platform may still send demand signals to the suppliers 144. In some embodiments, the custom replenishment signal may comprise a customized web-based mobile device application available to personnel working within the retail locations 124. It is envisioned that personnel working within the retail locations 124 may use the customized web-based mobile device application to send demand signals directly to suppliers 144 based on direct observation of the volume of products available for sale at the retail locations 124. Thus, the customized web-based mobile device application enables store-level personnel to send replenishment signals, thereby avoiding products becoming out of stock.

In some embodiments, the order management and invoicing system 128 comprises electronic data invoicing (EDI), such as store-level invoicing and receiving (EDI 894). It is envisioned that embodiments of the DTS system 104 utilizing EDI preferably support scalable volumes of products, as well as supporting drop-and-hook transportation processing.

Routing Consolidation and Optimization

As discussed above, the DTS system 104 comprises a routing optimization system 132. The routing optimization system 132 is configured to continually optimize an aggregate of orders so as to produce lowest-cost shipping solutions, which takes into consideration a wide variety of relevant variables, such as, by way of non-limiting example, payload optimization (e.g., dynamic quantities), delivery routing, delivery dates and times, locations, and the like.

In one embodiment, the routing optimization system 132 is configured to simultaneously use quantity tolerances for each retail location 124 and product physical properties for each product so as to determine an optimal order quantity for each retail location 124. As will be appreciated, quantities pertaining to a particular product will depend on the product to be shipped, such as, by way of non-limiting example, pallet, case, bottle, and the like. Further, product physical properties will depend upon the particular product to be shipped, such as, by way of non-limiting example, lengths, widths, heights, weights, volumes, and the like. Thus, the routing optimization system 132 facilitates optimally building truckloads of products and routing shipments so as to maximize the quantity of freight on each truck. In one embodiment, the routing optimization system 132 facilitates routing shipments across a range of payload weights and volumes.

In some embodiments, product quantities may be automatically adjusted after orders have been placed. For example, in some embodiments, the routing optimization system may be configured to utilize an order flexing system 134, or an optimization engine, to automatically increase or reduce initial customer orders by a set or flexible pallet, or a case count to maximize the quantity of freight comprising each single or multi-stop truckload. When adjustments must be made, preferably the largest quantity of products sharing the same stock keeping unit (SKU) are to be adjusted. For example, if an exemplary order comprises 5 pallets of 24 pk each and 1 pallet of 32 pk, quantity adjustments preferably are performed on the 5 pallets of 24 pk. In some embodiments, product quantities may be routed across a range of variable order quantities. It is envisioned that a range of possible adjustments may be taken into account during routing of shipments. In some embodiments, the routing optimization system 132 may further optimize product routing by incorporating nonlinear analysis, LP analysis, MIP analysis, heuristic analysis, as well as other similar analytical techniques.

In some embodiments, routing is optimized by determining the most efficient route for each truck to travel while taking into consideration load-leveling across multiple days. In one embodiment, the routing optimization system 132 is configured to take into consideration delivery windows and then schedule shipping appointments for each retail location 124, wherein the delivery windows for each retail location 124 may vary for each day of the week. In one embodiment, shipments may be routed and planned across a range of delivery dates. Thus, the routing optimization system 132 facilitates routing across multiple days in a delivery wave. Furthermore, loads may be leveled across delivery waves according to daily capacity constraints, as well as general minimums or maximums requested for each stop. In one embodiment, the routing optimization system 132 may accommodate carrier schedule functionality so as to enable carriers to update appointments within each delivery wave so they can load-level. In addition, embodiments of the routing optimization system 132 may utilize an "anchor store" strategy so as to smooth volume fluctuations and increase predictability in ordering and routing.

In some embodiments, the routing optimization system 132 may implement dedicated fleet utilization, solely or in combination with common carrier capacity, so as to load-level and combine routes, thereby optimizing the use of delivery drivers and equipment. In one embodiment, the routing optimization system 132 is configured to consider driver hours and hours of service rules so as to assign an optimal succession of loads and increase driver/equipment utilization.

Some embodiments of the routing optimization system 132 may utilize routing guides and carrier capacity constraints so as to enhance freight tendering. It is envisioned that, in some embodiments, the routing optimization system 132 enhances freight tendering by setting capacity allocations and including multiple carries on the routing guide. It is further envisioned that freight tendering may be enhanced by utilizing constraints on locations and allocations, prioritizing various loads, as well as distributing capacity among multiple carriers within specific regions. Furthermore, it is envisioned that loads may be prioritized by allocating capacity in a "smart" way based on ABC, as will be appreciated by those skilled in the art. For example, various loads may be prioritized based on carrier capacity, locations, predetermined retailer priorities, product values within loads, and the like. It will be appreciated, however, that when a specific carrier comes to capacity, loads being shipped by way of the DTS system 104 are to be prioritized over other loads that are unrelated to the DTS system.

Downstream Tracking and Notification

The DTS system 104 gives rise to a reduced inventory in an aggregate supply chain, due to the above-mentioned optimizations and enhancements. As such, ensuring on-time deliveries of scheduled shipments to the retail locations 124 is critical to prevent products from becoming out of stock. To this end, the tracking and notification system 136 is configured to provide the suppliers 144 with clear tracking visibility of en-route deliveries once they leave manufacturing facilities. Enhanced downstream visibility enables the suppliers 144 to take necessary actions to ensure on-time deliveries to their retail customers.

In some embodiments, the tracking and notification system 136 provides the suppliers 144 with actionable alerts based upon updates received from carriers in connection with truckloads in transit and/or loads in jeopardy of missing a scheduled delivery date or time. In one embodiment, the tracking and notification system 136 may incorporate EDI 214 data communications to identify shipments that could miss scheduled delivery due to, for example, missed pickup appointments, late delivery to previous stops, and the like. In some embodiments, tracking may be enhanced and improved by using RFID technology, or GS1-128 labeling so as to facilitate pallet visibility on truckload shipments, as well as manual input by way of mobile applications, and direct input by way of various asset monitoring devices. It is envisioned that carriers are to submit alerts in a timely fashion at each delivery stop along their shipping routes. Thus, if an alert is missing for a particular scheduled stop, the tracking and notification system 136 may flag the absent alert as a "threat," or as "urgent," which is then relayed to the supplier 144 for action. It is envisioned that actionable alerts and threats need only be issued for shipments that are in jeopardy of missing scheduled delivery.

In some embodiments, the tracking and notification system 136 is configured to update the retail locations 124 about the status of inbound deliveries. The tracking and notification system 136 preferably sends automatic reports to the retail locations 124 indicating the date and time shipments will arrive at their docks and the quantity of products in each shipment. It is envisioned that the various retail locations 124 are linked to the shipping carriers by way of the DTS system 104 so as to receive notifications about inbound shipments. It will be appreciated that since the DTS system 104 facilitates adjustments in delivery dates and times, shipping carrier capacities, and payload optimization, it is critical to keep retail stores informed.

Moreover, some embodiments of the DTS system 104 may distinguish DTS shipments from other shipments that are unrelated to the DTS system so as to enable plant shipping teams to prioritize loading and shipping of products. In one embodiment, the tracking and notification system 136 may track the fill-rate of the various retail locations 124 so as to facilitate optimization of future shipments. In one embodiment, tracking may be enhanced and improved by using RFID technology, or GS1-128 labeling so as to facilitate pallet visibility on truckload shipments. In some embodiments, the tracking and notification system 136 may track carrier specific performance in transporting DTS shipments so as to facilitate enhancing future shipments to the various retail locations 124. Further, the tracking and notification system 136 may track other carrier specific parameters, such as by way of non-limiting example, carrier cost, carrier service, carrier capacity commitments, carrier tender acceptance, average unload times, rejection rates, and the like. In still some embodiments, the tracking and notification system 136 may tabulate the various carrier specific parameters into a "carrier scorecard" which may be utilized to rate the performance of various carriers.

In one embodiment, the software used to facilitate the algorithms discussed herein can be embodied onto a non-transitory machine-readable medium. A machine-readable medium includes any mechanism that stores information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C+, C++, C#, Java, Python, php, .NET, JavaScript, UNIX Script, SQL, PL/SQL, or other similar languages. Also, an algorithm may be implemented with lines of code in software, configured logic gates in hardware, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A direct-to-store system comprising:
a memory for storing data and executable instructions;
a communication interface configured to communicate with an application server system;
an electronic processor communicatively coupled to the memory and the communication interface, the electronic processor configured to
control the communication interface to receive one or more initial demand signals from each of two or more retailers, the one or more initial demand signals including demand information for a product with a stock keeping unit (SKU),
route the one or more initial demand signals to one or more suppliers,
control the communication interface to receive an agreement from the one or more suppliers for maintaining an inventory of the product with the SKU,
control the communication interface to continuously receive one or more demand signals from the each of the two or more retailers indicating the inventory of the product with the SKU, the one or more demand signals being in parallel to each other,
dynamically determine, with a routing optimization system, an aggregate of orders from the one or more demand signals that are received from the each of the two or more retailers, wherein the aggregate of orders is a lowest-cost shipping solution based on at least one analytical technique, taking into consideration load-leveling across multiple days, according to capacity restraints of each retail location of the two or more retailers, and according to quantities necessary to maintain the agreement from the one or more suppliers for maintaining the inventory of the product with the SKU,
dynamically adjust, with an order flexing system, order quantities based on the one or more demand signals that are received from the each of the two or more retailers, the order quantities maximizing a quantity of freight within a load based on the SKU while minimizing a likelihood any of the two or more retailers goes below the agreed upon inventory of the product with the SKU or reaches a zero stock level of the product with the SKU, and
control the communication interface to transmit the aggregate of orders that are dynamically determined and the order quantities that are dynamically adjusted to the one or more suppliers,
wherein the one or more suppliers are completely distinct and separate entities from the two or more retailers, and
wherein at least two of the two or more retailers are completely distinct and separate entities from each other.

2. The direct-to-store system of claim 1, wherein the electronic processor, with a tracking and notification system, is further configured to
provide the one or more suppliers with tracking information about en-route deliveries, the tracking and notification system incorporating EDI 214 data communications in conjunction with RFID or GS1-128 labeling so as to facilitate pallet visibility, and
enable the one or more suppliers to take necessary actions to ensure on-time deliveries to retail locations of the two or more retailers.

3. The direct-to-store system of claim 1, wherein the electronic processor, with the routing optimization system, is further configured to consider at least one of payload optimization, delivery routing, delivery dates, delivery times, and retail locations of the one or more retailers.

4. The direct-to-store system of claim 1, further comprising:
an order management and invoicing system including a vendor-managed inventory (VMI) platform, wherein the VMI platform is a supplier platform for creation and adjustment of orders based on the aggregate of orders that is transmitted and the order quantities that are transmitted.

5. The direct-to-store system of claim 1, wherein the one or more demand signals are generated by a customized web-based mobile device application available to personnel working at retail locations of the two or more retailers.

6. The direct-to-store system of claim 1, wherein the electronic processor, with the order flexing system, is configured to use quantity tolerances for the each retail location of the two or more retailers and product weights for each product to determine an order quantity for the each retail location that prevents the product from reaching the zero stock level.

7. The direct-to-store system of claim 1, wherein the electronic processor, with the routing optimization system, is further configured to
consider delivery windows of retail locations of the two or more retailers, and
schedule shipping appointments for the each retail location based on the delivery windows that are considered.

8. The direct-to-store system of claim 7, wherein a delivery window associated with the each retail location varies with each day of the week.

9. The direct-to-store system of claim 2, wherein the electronic processor, with the tracking and notification system, is further configured to provide the one or more suppliers with actionable alerts based on updates received from carriers in connection with truckloads in transit.

10. The direct-to-store system of claim 2, wherein the electronic processor, with the tracking and notification system, is further configured to alert personnel at the retail locations of the two or more retailers about statuses of inbound deliveries.

11. A method to transmit orders of products from one or more suppliers directly to retail locations of two or more retailers, the method comprising:
controlling, with an electronic processor, a communication interface to receive one or more initial demand signals from each of two or more retailers, the one or more initial demand signals including demand information for a product with a stock keeping unit (SKU);
routing, with the electronic processor, the one or more initial demand signals to the one or more suppliers;
controlling, with the electronic processor, the communication interface to receive an agreement from the one or more suppliers for maintaining an inventory of the product with the SKU;
controlling, with the electronic processor, the communication interface to continuously receive one or more demand signals from the each of the two or more retailers indicating the inventory of the product with the SKU, the one or more demand signals being in parallel to each other;
dynamically determining, with the electronic processor, an aggregate of orders from the one or more demand signals that are received from the each of the two or more retailers, wherein the aggregate of orders is a lowest-cost shipping solution based on at least one analytical technique, by taking into consideration load-leveling across multiple days, according to capacity restraints of each retail location of the two or more retailers, and according to quantities necessary to maintain the agreement from the one or more suppliers for maintaining the inventory of the product with the SKU;
dynamically adjusting, with the electronic processor, order quantities based on the one or more demand signals that are received from the each of the two or more retailers, the order quantities maximizing a quantity of freight within a load based on the SKU while minimizing a likelihood any of the two or more retailers goes below the agreed upon inventory of the product with the SKU or reaches a zero stock level of the product with the SKU; and
controlling, with the electronic processor, the communication interface to transmit the aggregate of orders that are dynamically determined and the order quantities that are dynamically adjusted to the one or more suppliers,
wherein the one or more suppliers are completely distinct and separate entities from the two or more retailers, and
wherein at least two of the two or more retailers are completely distinct and separate entities from each other.

12. The method of claim 11, further comprising:
generating, with the electronic processor, a vendor-managed inventory (VMI) platform, wherein the VMI platform is a supplier platform for creation and adjustment of orders based on the aggregate of orders that is transmitted and the order quantities that are transmitted.

13. The method of claim 11, wherein the one or more demand signals are generated by a customized web-based mobile device application available to personnel working at the retail locations of the two or more retailers.

14. The method of claim 11, wherein dynamically determining, with the electronic processor, the aggregate of orders from the one or more demand signals further includes assembling truckloads of products based on at least one of product shipping quantities, product physical properties, delivery routing, delivery dates, delivery times, and the retail locations of the two or more retailers to maximize a quantity of products included in each of the truckloads.

15. The method of claim 11, further comprising:
executing, with the electronic processor, a tracking and notification system that is configured to provide the one or more suppliers with tracking information about en-route deliveries, the tracking and notification system incorporating EDI 214 data communications in conjunction with RFID or GS1-128 labeling so as to facilitate pallet visibility;
receiving, with the tracking and notification system, updates from carriers in connection with truckloads in transit; and
controlling, with the tracking and notification system, the communication interface to transmit actionable alerts to the one or more suppliers.

16. The method of claim 15, further comprising:
conveying, with the tracking and notification system, status information of any of the truckloads in transit to the retail locations of the two or more retailers.

17. The system of claim 1, further comprising:
a database server system configured to store lists of retail locations of the two or more retailers, the one or more suppliers, manufacturers, shipping carriers, product properties, and previous quantities previously ordered by the retail locations of the two or more retailers.

18. A non-transitory computer-readable medium comprising instructions that, when executed by an electronic processor, cause the electronic processor to perform a set of operations comprising:
- controlling a communication interface to receive one or more initial demand signals from each of two or more retailers, the one or more initial demand signals including demand information for a product with a stock keeping unit (SKU);
- routing the one or more initial demand signals to one or more suppliers;
- controlling the communication interface to receive an agreement from the one or more suppliers for maintaining an inventory of the product with the SKU;
- controlling the communication interface to continuously receive one or more demand signals from the each of the two or more retailers indicating the inventory of the product with the SKU, the one or more demand signals being in parallel to each other;
- dynamically determining an aggregate of orders from the one or more demand signals that are received from the each of the two or more retailers, wherein the aggregate of orders is a lowest-cost shipping solution based on at least one analytical technique, by taking into consideration load-leveling across multiple days, according to capacity restraints of each retail location of the two or more retailers, and according to quantities necessary to maintain the agreement from the one or more suppliers for maintaining the inventory of the product with the SKU;
- dynamically adjusting order quantities based on the one or more demand signals that are received from the each of the two or more retailers, the order quantities maximizing a quantity of freight within a load based on the SKU while minimizing any of the two or more retailers goes below the agreed upon inventory of the product with the SKU or reaches a zero stock level of the product with the SKU; and
- controlling the communication interface to transmit the aggregate of orders that are dynamically determined and the order quantities that are dynamically adjusted to the one or more suppliers,
- wherein the one or more suppliers are completely distinct and separate entities from the two or more retailers, and
- wherein at least two of the two or more retailers are completely distinct and separate entities from each other.

* * * * *